Sept. 7, 1943.　　　O. G. NELSON ET AL　　　2,329,130
MATERIAL HANDLING APPARATUS
Filed Nov. 26, 1941　　　3 Sheets-Sheet 1
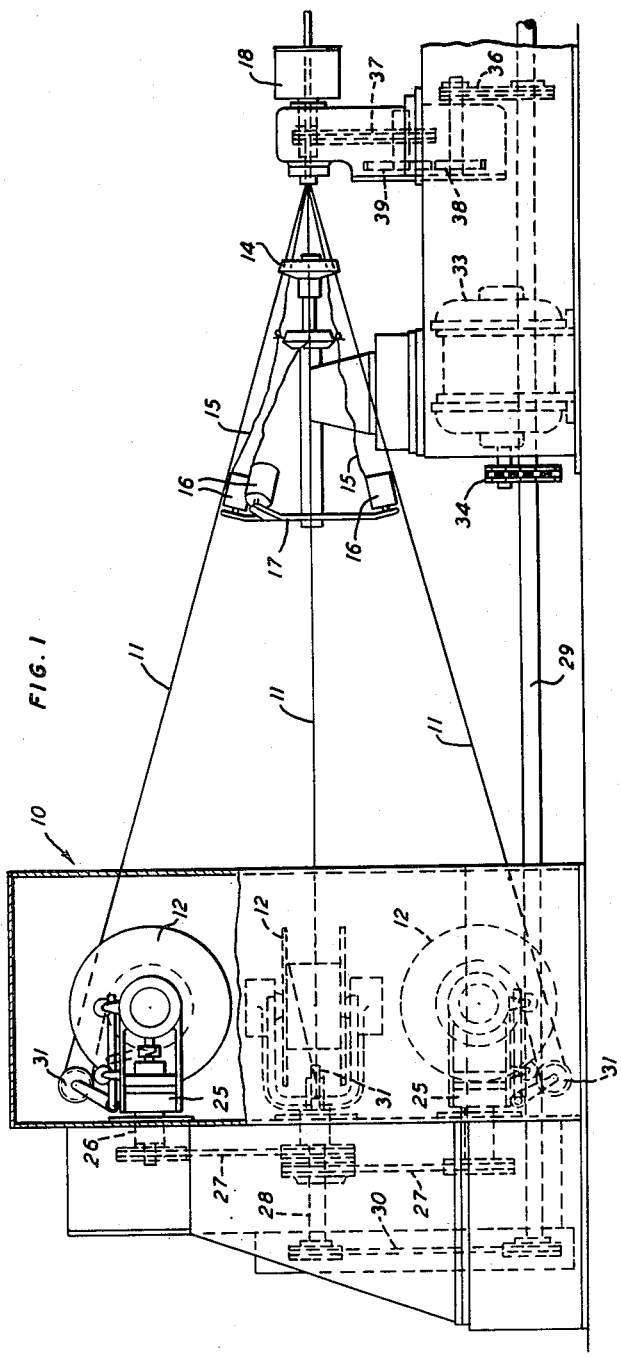
INVENTORS
O. G. NELSON
J. A. WAGNER
BY
E. R. Nowlan
ATTORNEY Sept. 7, 1943.  O. G. NELSON ET AL  2,329,130
MATERIAL HANDLING APPARATUS
Filed Nov. 26, 1941    3 Sheets-Sheet 2
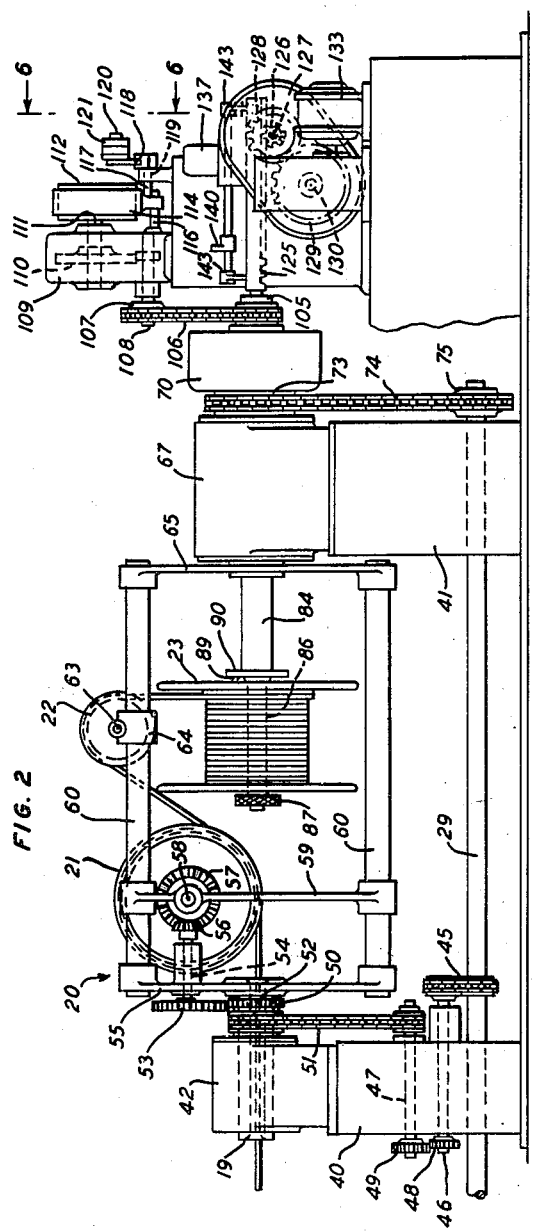
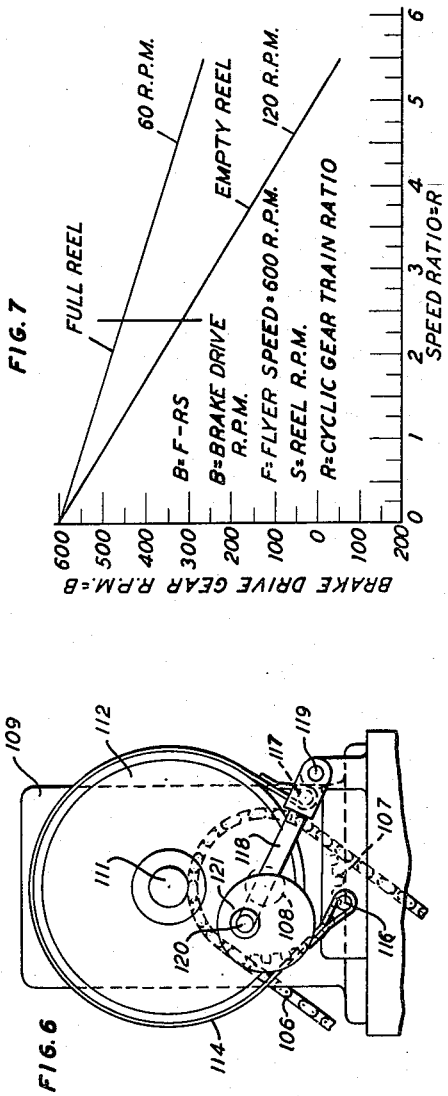
INVENTORS
O. G. NELSON
J. A. WAGNER
BY
E. R. Nowlan
ATTORNEY Sept. 7, 1943.   O. G. NELSON ET AL   2,329,130
MATERIAL HANDLING APPARATUS
Filed Nov. 26, 1941   3 Sheets-Sheet 3

INVENTORS
O. G. NELSON
J. A. WAGNER
BY
E. R. Nowlan
ATTORNEY

Patented Sept. 7, 1943

2,329,130

UNITED STATES PATENT OFFICE 2,329,130

MATERIAL HANDLING APPARATUS

Oscar G. Nelson and Julius A. Wagner, Baltimore, Md., assignors to Western Electric Company, Incorporated, New York, N. Y., a corporation of New York Application November 26, 1941, Serial No. 420,444

20 Claims. (Cl. 57—71)

This invention relates to material handling apparatus, and more particularly to flier stranders for forming cables for use in transmitting intelligence electrically.

In the manufacture of cables, particularly electrical cables, composed of a plurality of conductor wires twisted together, the final twisting operations are usually performed by flier units in which capstans are provided to advance the wires and take-up reels are disposed to receive the completed cable. The take-up reels necessitate distributing mechanisms for the cables and mechanisms to drive the take-up reel, and the locating of such mechanisms in the flier necessitates heavily constructed structures the speed of rotation of which is greatly limited.

An object of the invention is to provide a material handling apparatus, particularly for use in forming cables, which is simple in construction, automatically variable and capable of operating at high speeds.

With this and other objects in view, the invention comprises a material handling apparatus including a flier unit to twist together strands advanced thereto by a capstan, the unit being rotatable about an axis of a take-up reel, the latter driven by externally disposed mechanisms under the control of a remotely positioned braking force.

Other objects and advantages will be apparent from the following detailed description when taken in conjunction with the accompanying drawings, wherein Fig. 1 is a side elevational view of approximately one half of the apparatus;

Fig. 2 is a side elevational view of the remaining portion of the apparatus;

Fig. 6 is an enlarged fragmentary side elevational view taken substantially along the line 6—6 of Fig. 2, and Fig. 7 is a chart illustrating variations in the automatic control mechanism for the take-up reel.

Figure 3:
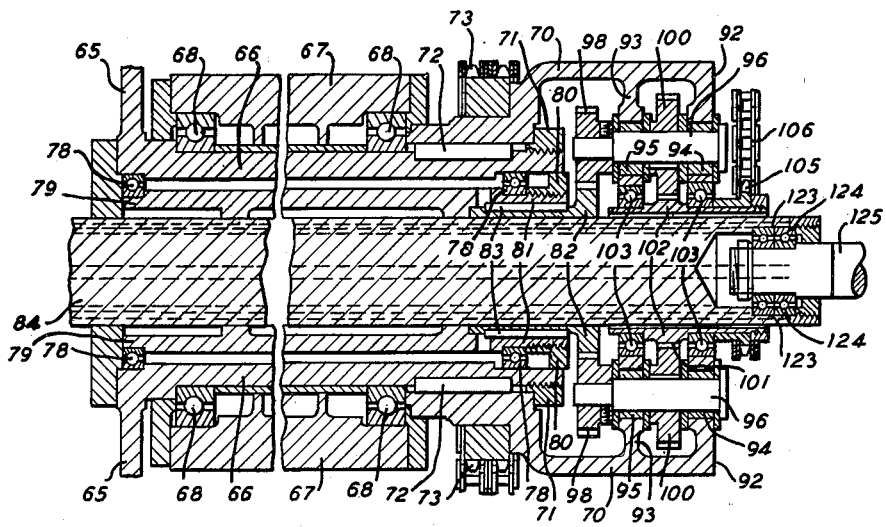
Fig. 3 is an enlarged fragmentary sectional view of a portion of the apparatus.
Figure 4:
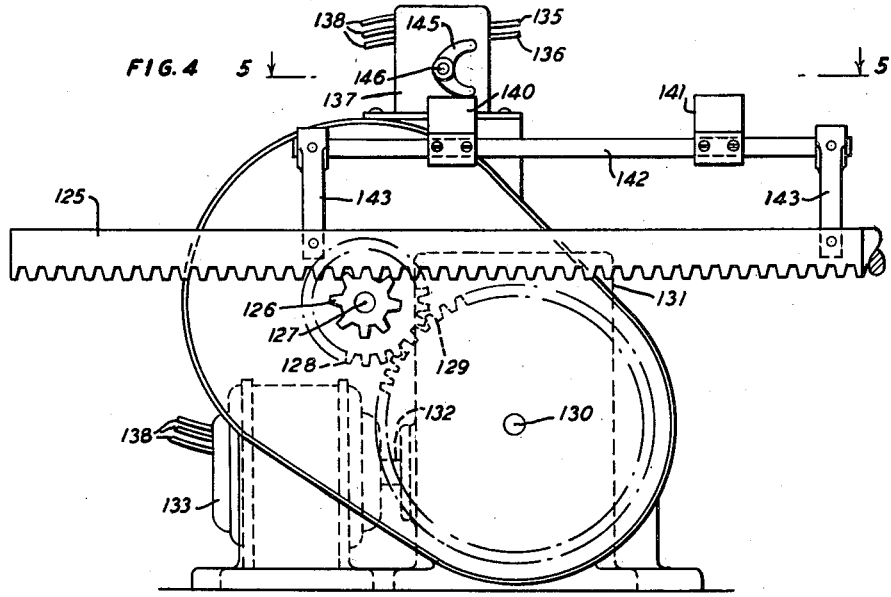
Fig. 4 is an enlarged fragmentary detailed view of a portion of the distributing mechanism.

Referring now to the drawings, attention is first directed to Figs. 1 and 2, illustrating at the extreme left of Fig. 1 a supply unit 10 for strands 11 withdrawn from supply reels 12 and directed to apertures in a gathering plate 14, through which also pass other strands 15, for example textile threads, taken from supply spools 16 on a support 17. The strands then pass through a serving head 18 by the aid of which a covering of suitable material may be wrapped about the strands. The strands then pass through a hollow shaft 19, supporting one end of a flier unit 20, travel about a capstan 21, lying in the peripheral grooves thereof, and finally pass over a sheave 22 to a take-up reel 23.

For a more complete understanding of the supply reel structure, attention is directed to the copending application Serial No. 408,610 filed August 28, 1941 by George E. Henning and Julius A. Wagner. In the present embodiment there are seven supply reels, six of which are disposed in circular arrangement about a central reel, all of which are rotatably supported by suitable brackets 25, the latter being mounted on individual shafts 26 for rotation through sprocket and chain connections 27 with a shaft 28. The shaft 28 is driven from a main shaft 29 through a sprocket and chain connection 30. Suitable tensioning means may be provided for the strands passing from each supply reel 12, such tensioning means including a sheave 31 over which the strands pass. Heretofore the strands 11 have been defined as being single strands taken from each reel. It should be understood that the strands are in pairs, or other groups of different numbers, twisted together through the rotation of their reels.

The main shaft 29 is driven by a motor 33 through a sprocket and chain connection 34. As will be noted, the main shaft 29 extends almost the full length of the apparatus, driving also the serving head 18 through sprocket and chain connections 36 and 37 and intermediate gears 38 and 39 respectively.

Attention is now directed to Figs. 2 and 3, viewing first Fig. 2 where there are illustrated supporting frames 40 and 41 upon each side of the flier unit 20. Upon the frame 40 a bearing bracket 42 is mounted for rotatably supporting the shaft 19. The driving mechanism for the capstan 21 is taken from the drive shaft 29 through a sprocket and chain connection 45 to a shaft 46. The shaft 46 together with a shaft 47 are suitably journalled in bearings supported by the frame 40 and are operatively connected to each other by change gears 48 and 49 respectively. The change gears 48 and 49 are so called due to the fact that they are interchangeable to vary the speed of the capstan depending upon the speed required to advance the strands. The gears 48 and 49 may also be replaced by other gears having different ratios or by a variable speed transmission to cause further variations in the speed of the capstan. A hollow shaft 50 is rotatably supported upon the shaft 19 and is operatively connected to the shaft 47 through a sprocket and chain connection 51. A gear 52, also mounted upon the shaft 50, interengages a gear 53 to drive a shaft 54, the latter being rotatably supported in an arm 55 of the flier unit 20. A bevelled gear 56, mounted upon the inner end of the shaft 54, interengages a bevelled gear 57 of a shaft 58, upon which the capstan 21 is mounted. The shaft 58 is supported by a bracket 59 the ends of which are formed to receive and be mounted upon cross bars 60 of the flier unit. The sheave 22 is rotatably supported on a shaft 63, the latter being supported by a bracket 64 mounted upon one end of the cross bars 60.

The flier unit 20 has an arm 65, supporting the cross bars 60 with the arm 55, with a hub 66 which extends through a bearing bracket 67, the latter being mounted upon the frame 41. Bearings 68 in the bracket 67 rotatably support the hub 66 and thus the adjacent end of the flier unit 20 through the arm 65. A housing 70 of the contour illustrated in Figs. 2 and 3, is disposed concentric with the hub 66, held thereon by a nut 71 and keyed thereto, as at 72. The housing 70 supports a sprocket 73 which is operatively connected to the drive shaft 29 through a chain 74 and sprocket wheel 75, the latter being mounted upon the drive shaft. Bearings 78 are disposed in the hub 66 adjacent the ends thereof, to support a splined mechanism including a sleeve 79, extending almost the full length of the hub, and threaded members 80 and 81, the latter formed upon the end of the sleeve, connecting the sleeve to a sun gear 82 through a key 83. The gear 82 is also splined and is disposed with the sleeve 79 concentric with a splined shaft 84, the shaft thus being connected for rotation with the gear and sleeve but movable axially relative thereto.

Returning momentarily to Fig. 2, attention is directed to a reduced portion 86 of the shaft 84, upon which the take-up reel 23 is mounted. The reel is removably held in place by a nut 87 and connected for rotation with the shaft through a pin 89 of a collar 90, the pin receivable in an aperture (not shown) in the adjacent head of the reel.

Attention is again directed to Fig. 3, particularly the housing 70 which has an outer end portion 92 and a central portion 93 provided with sets of aligned bearings 94 and 95 respectively for shafts 96. Planet gears 98 are mounted upon the innermost ends of the shafts 96 and are positioned about the sun gear 82 in engagement therewith. Planet gears 100 are also mounted upon the shafts 96 and fixed thereto, these gears being disposed at spaced positions about a sun gear 101, the latter being supported by or formed integral with a sleeve 102. The sleeve 102 with the sun gear 101 is disposed concentric with the splined shaft 84 for rotation relative thereto and is supported by spaced bearings 103, the latter being supported by the portions 92 and 93 of the housing 70. The sleeve 102 extends beyond the housing 70 and supports a sprocket wheel 105, the latter being connected, through a chain 106, to a sprocket wheel 107. The sprocket wheel 107 is mounted upon a shaft 108, the latter being suitably journalled in a housing 109 of a desired set of reduction gears 110, an outlet shaft 111 of which supports a brake drum 112.

Attention is now directed to Fig. 6, as well as Fig. 2, which illustrates a brake band 114, having one end fixed at 116, extending about the brake drum 112 to a portion 117 of a weight lever 118, where the opposite end of the brake band is secured. The lever 118 is pivotally supported, at 119, and supports at its free end 120, weights 121.

Attention is again directed to the splined shaft 84, particularly the outer or right end (Figs. 2 and 3). This end of the shaft is made hollow, as at 123, to receive bearings 124 which support a rack 125. The bearings 124 thus permit rotation of the splined shaft and adapt the rack to be held against rotation. The rack 125 is of suitable length and is supported for longitudinal movement, which movement is imparted thereto through a pinion 126. The pinion 126 is mounted upon a shaft 127, the latter supporting a gear 128 positioned to interengage a gear 129. These gears may be termed change gears, as they are interchangeable or may be replaced with other gears of varying ratios to vary the speed of movement of the rack and thus the take-up reel through the splined shaft 84. The gear 129 is mounted upon a shaft 130, the latter being a part of a reduction gear mechanism 131, the input shaft of which is indicated at 132, this being a shaft of a motor 133. Thus the rack is driven from the motor through its shaft 132, the reduction gears in the mechanism 131, the shaft 130, through the gears 129 and 128, to the pinion 126.

Figure 5:
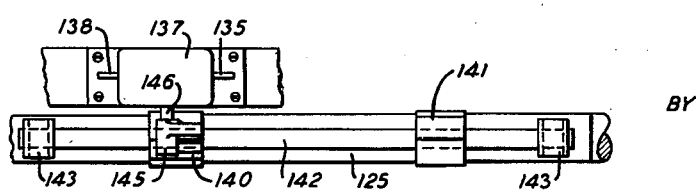
Fig. 5 is a fragmentary sectional view taken along the line 5—5 of Fig. 4.

The motor is driven by electrical energy supplied to an electrical circuit (not shown), conductors 135 and 136, however, being a part thereof and including in the circuit a limit switch 137 electrically connected to the motor through conductors 138. The limit switch 137 is of the two position type, for effecting rotation of the motor in one direction when in one position and rotation of the motor in a reverse direction when in the other position. Adjustable actuating members 140 and 141, supported at suitable positions upon a bar 142 parallel with the rack 125, are formed to engage their respective ends of a U-shaped switch member 145 to effect actuation of the switch from one position to the other. The bar 142 is supported by brackets 143 mounted on the rack 125 for movement therewith. The member 145 is fixed to a shaft 146 of the switch 137, the shaft extending into the switch and controlling mechanism thereof to effect actuation of the switch from one position to the other. As will be observed from viewing Fig. 5, the ends of the member 145 are disposed in staggered positions so that they will engage their respective members 140 and 141 which are also disposed out of alignment with each other.

The operation of the apparatus is as follows. Starting with the supply unit 10, the pairs or sets of strands 11 receive their individual twist in the same direction, this direction being identical with the twist they receive from the flier unit. The twist in the group of strands, resulting from the rotation of the flier unit, carries back to the point where the strands enter the serving head mechanism. These twisted strands thus enter the hollow shaft 19 as a unit and are advanced as such through the rotation of the capstan. The capstan is driven from the drive shaft 29 through the sprocket and chain connections 45 and 51 coupled by the shafts 46 and 47 and their change gears 48 and 49, to drive the gears 52 and 53 to finally drive the bevelled gears 56 and 57, the latter causing rotation of the capstan 21 in a direction to advance the cable unit of twisted strands. The cable unit, upon leaving the capstan, travels over the sheave 22 and leaves the sheave at a point lying in a fixed plane to pass onto the take-up reel 23.

The driving connection for the reel is followed back through the splined shaft 84, the cyclic gear train including the sun gear 82, the planet gears 98, the shafts 96, the planet gears 100, sun gear 101, and the driving connection with the brake drum 112. In the present embodiment the planet gears 98 have twenty teeth, while the sun gear 82 has seventy teeth. The planet gears 100 have thirty-six teeth, while the sun gear 101 has fifty-four teeth. Therefore, the cyclic gear train speed ratio represented by $$R = 70/20 \times 36/54 = 7/3 = 2.333$$

The speed of rotation of the flier unit is in the present embodiment 600 R. P. M. With these factors in mind, attention is directed to the brake mechanism (Figs. 2 and 6) which illustrate that an opposing or braking force is applied to the mechanism linking the brake with the take-up reel, to provide a predetermined tension on the material or cable unit wound upon the reel. This braking force may be varied depending upon the material or the size of the cable unit, by adding or taking away weights 121 from the lever 118. These weights, through the function of the lever, cause the brake band 114 to create a definite braking force on the drum, which force carries back through the connecting driving mechanism and the reel to the strand.

As the flier unit 20 is rotated through the sprocket and chain connection 73—75, the planet gears 98 and 100 travel about their sun gears 82 and 101 respectively. The planet gears 98 and 100 being connected in their pairs upon common shafts 96, create relative rotation of the sun gears 82 and 101 respectively due to the speed ratio of the cyclic gear train. The braking force from the brake drum 112 tends to hold the gear 101 against rotation while the tension on the material creates a force, coupled with the radial torque of the material on the reel, which travels back through the splined shaft 84 to the sun gear 82, tending to hold the sun gear 82 against rotation. The force created by the tension of the strand at the reel, varies with variation in the radius of the material on the reel. Therefore, with an empty reel, that is at the beginning of the operation of the apparatus, the effective force resulting from the tension of the material and its connection with the reel will be at its minimum, this force increasing with each layer of strand material on the reel, effectively increasing the radial torque thereof until the reel is full, at which time the force including the tension of the material coupled with the radial torque will be at its maximum. Therefore, the tension in the cord is due solely to the brake drag, the latter serving to effect driving of the reel in a direction with the flier and at a speed variable with the variations in the material on the reel. The braking force thus tends to hold the sun gear 101, effecting, through its planet gears and shafts, rotation of the planet gears 98 to effect rotation of the sun gear 82. The sun gear 82, with its sleeve 79 being connected to the splined shaft 84, effects rotation of the splined shaft at a speed less than the speed of rotation of the flier, depending upon the braking force. Thus the driving power of the flier, which includes the housing 70 carrying the cyclic gear train and tending to rotate with it the splined shaft 84 and the reel 23, loses a proportional amount of its power as a result of the braking force at 112. Thus the horse power or driving force extended to wind the strands on the reel is dissipated at the brake depending upon the braking force there present.

To illustrate this feature more clearly, attention is directed to the chart in Fig. 7, where the vertical line represents speeds of the brake drive gear, namely the sun gear 101. These speeds are represented by B and the numbers spaced along the vertical line represent revolutions per minute of this gear. The horizontal line represents R, namely the cyclic gear train speed ratio. The diagonal lines indicate the revolutions per minute of the reel. The short vertical line passing through the diagonal lines illustrates the present value R, that is the speed ratio of the present cyclic gear train. By representing the revolutions per minute of the reel with the character S, the following equation may be employed: $B = F - RS$.

Considering the line representing the empty reel, it will be noted that for the present speed ratio, represented by the short vertical line, while the flier unit is travelling at 600 R. P. M., the sun gear 101, represented by S, is travelling at 320 R. P. M., and thus by following the equation it will be found that B (320 R. P. M.) = F (600 R. P. M.) − R (2.333 R. P. M.) S. Thus the revolutions per minute of the reel and sun gear 101 are 120 R. P. M. In following the same equation through the aid of the chart, for the line representing the full reel at the intersecting vertical line, the speed of the sun gear 101 is 460 R. P. M., the speed of the flier and the speed ratio of R remaining the same, the speed of the reel will be 60 R. P. M. Thus as the radial torque at the reel increases due to the building up of the material thereon, more energy tending to rotate the reel is dissipated through the brake, resulting in an intermittent reduction in the speed of rotation of the reel as each layer of material is completed thereon.

Returning again to the chart in Fig. 7, it will be apparent that by selecting any value R, regardless of what the value B may be, the values S remain the same for the respective empty and full reels, these values intermittently or continuously decreasing from 120 R. P. M. for an empty reel to 60 R. P. M. for a full reel. For example, let it be assumed that the value R is 3, the value F remaining the same. The brake sun gear (101) speed when the reel is empty, would be 240 R. P. M., resulting in a speed of 120 R. P M. for the reel. Upon considering this same equation for the full reel at the same speed ratio, the value B will be 420, the value S 600, the value R 3, resulting in the value S as 60 R. P. M.

It will, therefore, be apparent that the planetary or cyclic gear train constitutes a rotatable driving means having a power input and power outputs. The power input is at the shafts 96, receiving a constant driving force from the housing 70. The power outputs are at the sun gears 82 and 101, they being connected respectively to the take-up reel and the brake. Through the application of a constant opposing or braking force to one output, the driving means or gear train is rendered effective to rotate the reel through its connection with the other output. As a result of the constant opposing force at the brake output end, a constant tension is created on the material which, with the increasing radial torque, during the building up of the material on the reel, applies a varying opposing force at the reel output end, causing a reduction in the speed of the reel from an empty position to a full position. This brings about a constant surface travel of the reel at the point the strand material is wound thereon, to wind the strand material on the reel at a constant rate.

During the rotation of the reel for the winding of the strand material thereon, the reel is moved relative to the point of winding, that is relative to the exit point of the sheave 22, through the driving of the motor 133. The motor, through the reduction gear mechanism 131 and the change gears 128 and 129, rotates the pinion 126 first in one direction, to move the rack 125 with the splined shaft 84 and the reel, this movement being limited by the control member 140 or 141 which, in their turn, actuate the switch 137 to reverse the direction of rotation of the motor and thus reverse the direction of travel of the reel. Through the adjustment of the members 140 and 141 on their supporting bar 142, the movement of the reel may be controlled so that the strand material will uniformly lie on the reel and will not build up at the heads or stop short thereof. The variations in the size of the reel and/or the diameter of the strand material may necessitate further changes in the traversing mechanism, these changes being made possible through the interchanging of the gears 128 and 129 or the substitution of other gears therefor.

In reviewing the features of the apparatus, it will be apparent that the flier unit 20 is relieved of all possible structure, the unit including, in addition to the bare framework thereof, only the capstan 21 and the sheave 22. The driving mechanism for the capstan is disposed externally of the flier and the change gears 48 and 49 of this mechanism are disposed where they will be readily accessible without the necessity of dismantling the flier unit. Furthermore, the distributing mechanism, for the material being wound on the reel, has been removed entirely from the flier unit and although the take-up reel is physically present in the flier, it is not supported by the flier but is supported by the shaft 84, the latter receiving its support externally of the flier unit. The element 84, namely the splined shaft, serves its different functions, one in its linkage with one of the power outputs of the planetary or cyclic gear train to receive the function of the gear train under the control of the opposing force, namely the brake drum 112 and its brake band 114, operatively connected to the other power output of the gear train. The gear train or driving means for the reel is operatively connected to a power means at its power input through the housing 70 which is rotated with the flier unit but disposed externally thereof. Returning again to the element or splined shaft 84, the other function thereof is realized through its association with the rack 125 and the other elements of the distributing mechanism. With these features in mind, it is apparent that the weight of the flier unit may be reduced to a minimum due to the fact that it has but a small structure to support and may, therefore, be rotated at suitably high speeds.

The embodiment of the invention herein illustrated is merely illustrative and may be widely modified and departed from in many ways without departing from the spirit and scope of the invention as pointed out in and limited solely by the appended claims.

What is claimed is:

1. In a material handling apparatus, a reel rotatable for the winding of material thereon, a planetary gear train having a power input and a plurality of power outputs, driving means for the said power input, means connecting the reel to one of the said outputs to be driven thereby, and means connected to another of the said outputs to render the said gear train effective to rotate the reel.

2. In a material handling apparatus, a reel rotatable for the winding of material thereon, a planetary gear train having a power input and a plurality of power outputs, constant driving means for the said input, means connecting the reel to one of the said outputs to be driven thereby, and means connected to another of the said outputs to render the said gear train effective to rotate the reel.

3. In a material handling apparatus, a reel rotatable for the winding of material thereon, a planetary gear train having a power input and a plurality of power outputs, driving means for the said power input, means connecting the reel to one of the said outputs to be driven thereby, and means connected to another of the said outputs to render the gear train effective to rotate the reel at variable speeds.

4. In a material handling apparatus, a reel rotatable for the winding of material thereon, a planetary gear train having a power input and a plurality of power outputs, constant driving means for the said input, means connecting the reel to one of the said outputs to be driven thereby, and means connected to another of the said outputs to render the gear train effective to rotate the reel at variable speeds.

5. In a material handling apparatus, a reel rotatable for the winding of material thereon, a planetary gear train having a power input and a plurality of power outputs, constant driving means for the said input, means connecting the reel to one of the said outputs to be driven thereby, and means applying an opposing force to another of the said outputs to render the said gear train effective to rotate the reel.

6. In a material handling apparatus, a reel rotatable for the winding of material thereon, a planetary gear train having a power input and a plurality of power outputs, constant driving means for the said input, means connecting the reel to one of the said outputs to be driven thereby, and means applying an opposing force to another of the said outputs to render the said gear train effective to rotate the reel and create a predetermined tension on the material.

7. In a material handling apparatus, a reel rotatable for the winding of material thereon, a planetary gear train having a power input and a plurality of power outputs, constant driving means for the said input, means connecting the reel to one of the said outputs to be driven thereby, and means to apply a constant opposing force to another of the said outputs to render the said gear train effective to rotate the reel and create a constant tension on the material.

8. In a material handling apparatus, a reel rotatable for the winding of material thereon, a planetary gear train having a power input and a plurality of power outputs, constant driving means for the said input, means connecting the reel to one of the said outputs to be driven thereby, and means to apply a constant braking force to another of the said outputs to render the said gear train effective to rotate the reel and create a constant tension on the material, the force of the tension on the material coupled with an increasing radial torque of the material on the reel opposing the said braking force to cause the gear train to drive the reel at a varying speed.

9. In a material handling apparatus, a reel rotatable for the winding of material thereon, rotatable driving means having a power input and a plurality of power outputs, means connecting the reel to one of the said outputs to be driven thereby, and means connected to another of the said outputs to render the driving means effective to rotate the reel.

10. In a material handling apparatus, a reel rotatable for the winding of material thereon, rotatable driving means having a power input and a plurality of power outputs, means connecting the reel to one of the said outputs to be driven thereby, and means to apply a braking force to another of the said outputs to render the said driving means effective to rotate the reel at variable speeds.

11. In a material handling apparatus, a reel rotatable for the winding of material thereon, rotatable driving means having a power input and a plurality of power outputs, means connecting the reel to one of the said outputs to be driven thereby, and means to apply a braking force to another of the said outputs to render the driving means effective to rotate the reel and create a constant tension on the material.

12. In a material handling apparatus, a reel rotatable for the winding of material thereon, rotatable driving means having a power input and a plurality of power outputs, means connecting the reel to one of the said outputs to be driven thereby, and means to apply a braking force to another of the said outputs to render the driving means effective to rotate the reel and create a constant tension on the material, the force of the tension on the material coupled with an increasing radial torque of the material on the reel opposing the said braking force to cause the the gear train to drive the reel at a varying speed.

13. In a material handling apparatus, a reel rotatable for the winding of material thereon, a planetary gear train of a predetermined speed ratio having a power input and power outputs, driving means for the said power input, means connecting the reel to one of the said outputs to be driven thereby, and means connected to the other output to render the gear train effective to rotate the reel at speeds varying from a given beginning speed to a given slower speed when the reel is full.

14. In a material handling apparatus, a reel rotatable for the winding of material thereon, a planetary gear train of variable speed ratios having a power input and power outputs, driving means for the said power input, means connecting the reel to one of the said outputs to be driven thereby, and means connected to the other output to render the gear train effective to rotate the reel at speeds varying from like beginning speeds to like slower speeds when the reel is full regardless of the speed ratios of the gear train.

15. In a material handling apparatus, a flier unit rotatable about an axis to twist strand material advanced thereto, means to rotate the flier at a constant speed, a take-up reel disposed within the flier unit and rotatable on the said axis for the winding of the material thereon, and brake controlled means driven by the flier unit to rotate the reel at a decreasing speed.

16. In a material handling apparatus, a flier unit rotatable about an axis to twist strand material advanced thereto, means to rotate the flier at a constant rate in a given direction, a take-up reel disposed within the flier unit and rotatable for the winding of the material thereon, an element axially disposed relative to the flier unit to support the reel, and brake controlled means driven by the flier unit to rotate the reel in the same direction with the unit but at a slower speed.

17. In a material handling apparatus, a flier unit rotatable about an axis to twist strand material advanced thereto, means to rotate the flier at a constant speed, a take-up reel rotatable for the winding of the material thereon, an element axially disposed relative to the flier unit to support the reel, rotatable driving means having a power input and plurality of power outputs, means connecting the said input with the flier unit, means operatively connecting the element to one of the said outputs to be driven thereby, and means to apply an opposing force to the other of the said outputs to render the driving means effective to rotate the reel and create a constant tension on the material.

18. In a material handling apparatus, a reel rotatable for the winding of material thereon, means to feed the material to the reel at a constant rate, rotatable driving means having a power input and power outputs, driving means for the input, means connecting the reel to one of the said outputs to be driven thereby, a brake member operatively connected to another of the outputs and rotated thereby, and means to apply a given braking force to the brake member to render the said driving means effective to rotate the reel at a variable speed.

19. In a material handling apparatus, a reel rotatable for the winding of material thereon, means to feed the material to the reel at a constant rate, rotatable driving means having a power input and power outputs, driving means for the input, means connecting the reel to one of the said outputs to be driven thereby, a brake member operatively connected to another of the outputs and rotated thereby, a brake element held against rotation with the brake member, and means to actuate the element to create a given braking force on the brake member which force is translated to the said connected output to render the said driving means effective to rotate the reel at a variable speed.

20. In a material handling apparatus, a reel rotatable for the winding of material thereon, means to feed the material to the reel at a constant rate, rotatable driving means having a power input and power outputs, driving means for the input, means connecting the reel to one of the said outputs to be driven thereby, a brake member operatively connected to another of the outputs and rotated thereby, a brake element held against rotation with the brake member, and means to actuate the element to create a given braking force on the brake member which force is translated to the said connected output to render the said driving means effective to rotate the reel and create a constant tension on the material, the force of the tension on the material coupled with an increasing radial torque of the material building up on the reel opposing the said braking force to cause the gear train to drive the reel at a varying speed.

OSCAR G. NELSON.
JULIUS A. WAGNER.